Feb. 19, 1935.        M. F. RICH        1,991,866
LIGHT PROJECTION LAMP
Filed Aug. 31, 1933        2 Sheets-Sheet 1
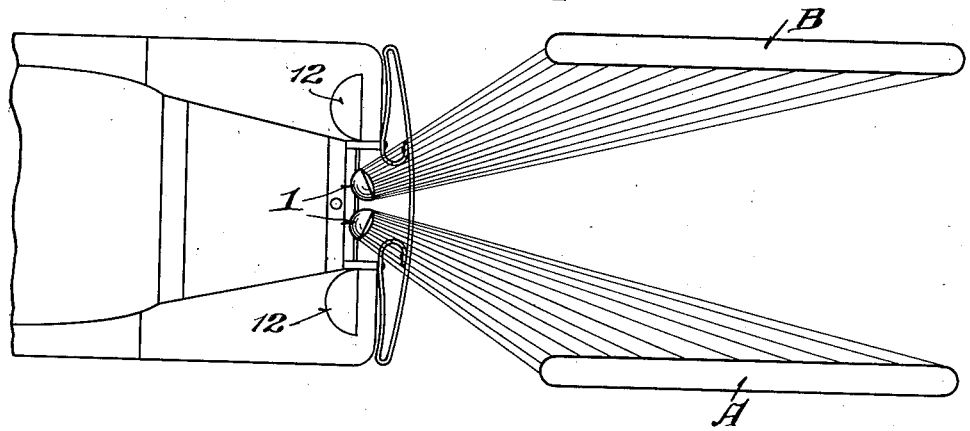
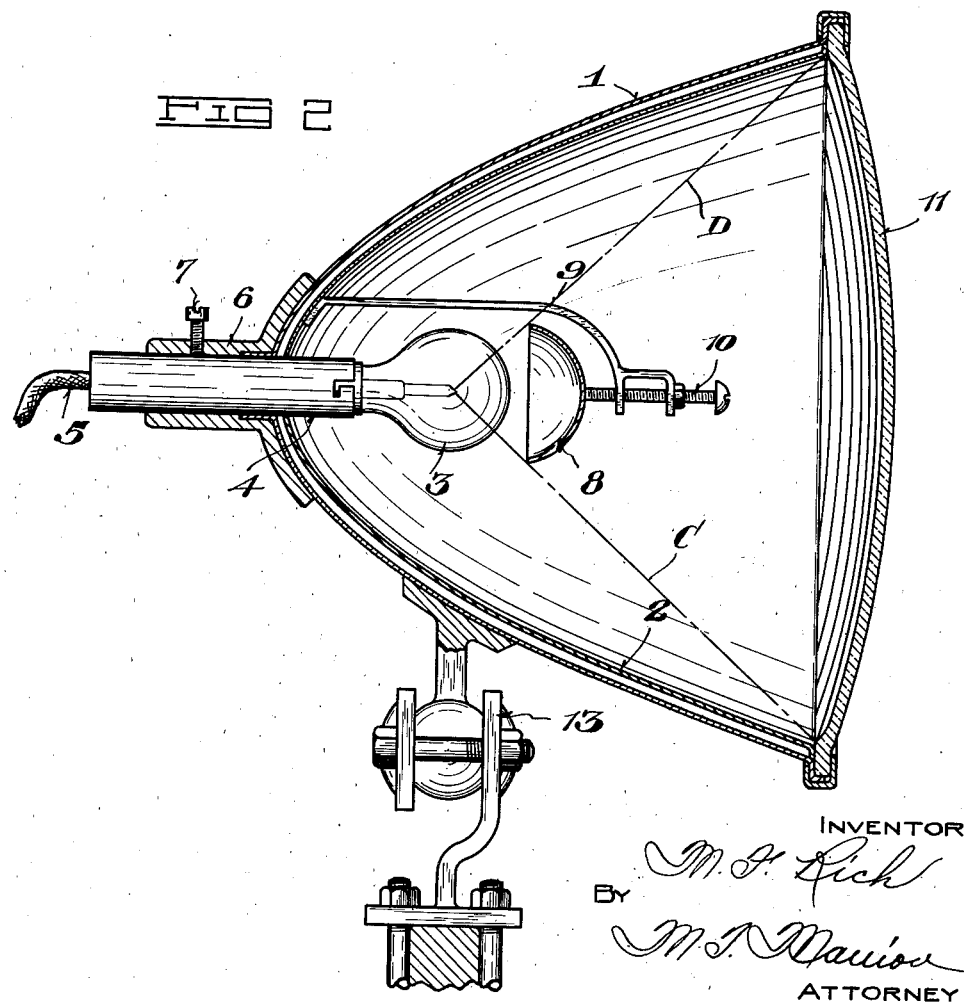
INVENTOR
M. F. Rich
By
ATTORNEY

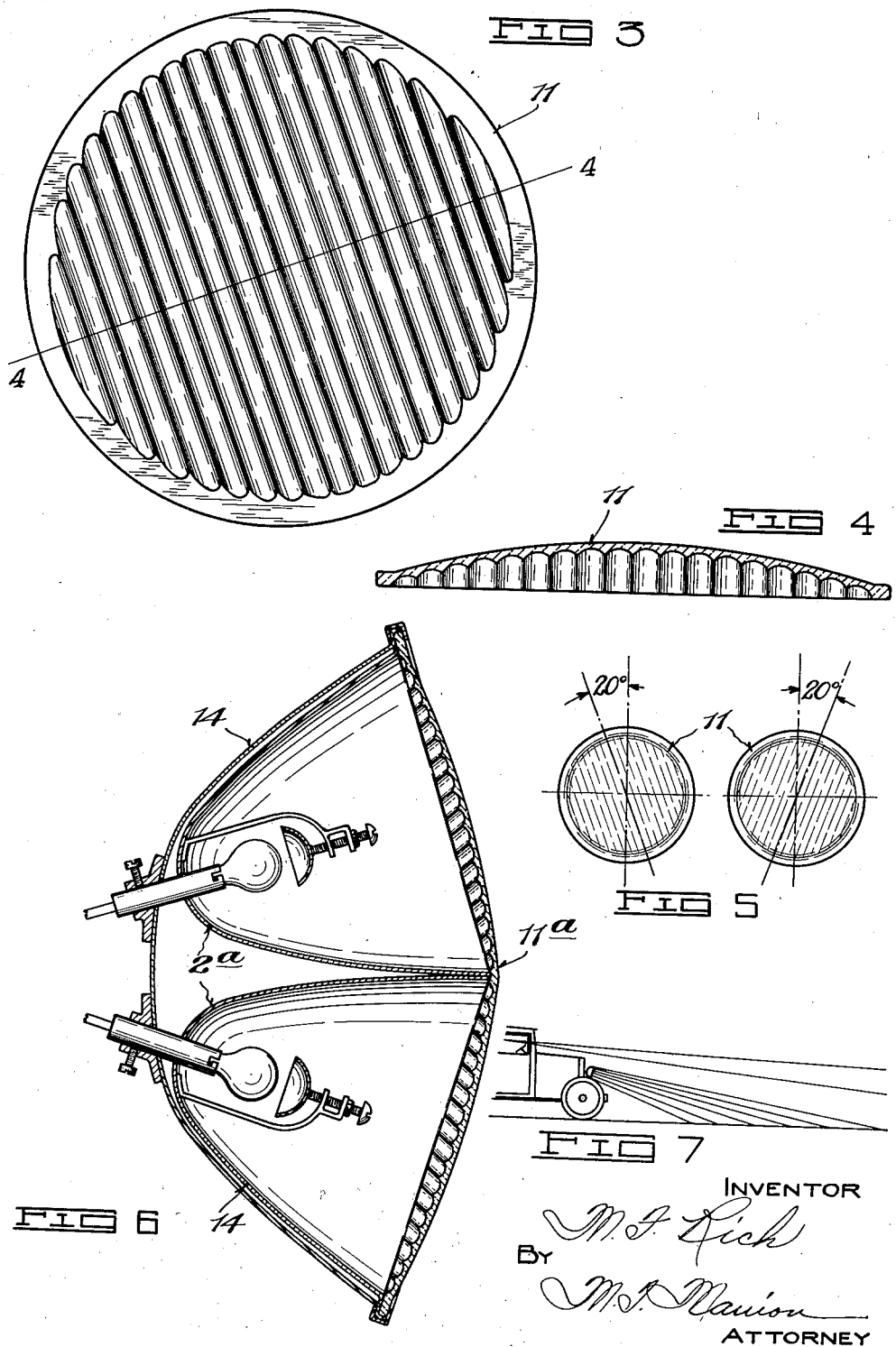

Patented Feb. 19, 1935

1,991,866

UNITED STATES PATENT OFFICE 1,991,866

LIGHT PROJECTION LAMP

Martin F. Rich, Cleveland Heights, Ohio, assignor of one-fourth to Ben Kapner, Bellaire, Ohio Application August 31, 1933, Serial No. 687,607

4 Claims. (Cl. 240—7.1)

This invention relates broadly to vehicle headlights, and more particularly to headlights for facilitating driving under conditions of poor visibility, especially fog, the same being adapted for use on automobiles, locomotives, ships, motorboats, airplanes, airport boundary lights, and any other movable or immovable object wherein illumination is necessary or desired under adverse conditions.

One of the objects of the invention is to provide a vehicle headlight of the character mentioned which is designed to project from said headlight a beam of light of sufficient intensity to illuminate the roadway, such illumination being accompanied by a minimum of diffusion.

Another object of the invention is to provide means whereby a controlled beam or beams of light rays may be projected from a headlight to a roadway over a substantially elongated rectangular area, the focusing or positioning of said beam or beams being adjustable to meet varying conditions.

A further object of the invention is to provide a light projector of this character which provides two elongated concentrated beams of light which are disposed parallel to the side edges of the road and to each other.

A still further object is the provision of a device of the character mentioned wherein the forwardly projected rays are at all times maintained out of the line of vision of the operator of the vehicle.

In describing the invention in detail, reference is herein had to the accompanying drawings, in which—

Figure 1 is a top plan view of the front portion of an automobile with a set of two of my lights attached thereto and illustrating the character and preferred positioning of the two beams which are parallel to the edges of the highway;

Figure 2 is a vertical sectional view of my headlight and associated elements, the same disclosing the universal mounting;

Figure 3 is a face view of a glass lens;

Figure 4 is a sectional view taken on line 4—4, Fig. 3;

Figure 5 is a front face view of a set of two of the glass lenses illustrating the inclined positions occupied by the flutes or grooves;

Figure 6 is a horizontal sectional view of a modification of the invention disclosing two light projectors mounted in a single housing; and—

Figure 7 is a diagrammatic view similar to Fig. 1 depicting in side elevation the projection of the light rays and the angle thereof with respect to the line of vision of the operator.

Referring to said drawings, the reference numeral 1 designates a headlight casing having properly disposed interiorly thereof a parabola-shaped reflector 2, the light source, as an incandescent lamp 3, being disposed at the focus of the reflector in a lamp socket 4, which lamp socket houses the current conducting wire 5 and is made of tubular form. Said lamp socket, as shown in Fig. 2, extends outwardly and rearwardly of the casing 1 through an aperture and is slideably received in a sleeve 6, which latter is permanently attached to the casing. This construction permits of forward and rearward adjustment of the lamp 3 for focusing purposes, the lamp socket 4 and lamp 3 being maintained, when properly focused, in fixed position by a set screw 7.

Located at a spaced distance forwardly of the lamp 3 and in axial alinement therewith is a baffle 8, which latter is preferably of hollow concave semi-spherical form, composed of an opaque material, and whose concave surface is dull and unpolished and, therefore, non-reflective, and preferably has a diameter exceeding that of the lamp. Said baffle is preferably rigidly suspended in the position above described by means of an overlying supporting member 9, which has one end thereof attached to the reflector 2 and has its opposite end free to receive in threaded relation a machine screw 10 to which is attached in fixed relation the baffle 8, as is clearly shown in Fig. 2. The baffle is so positioned, that forwardly directed light rays radiating from the lamp filament are intercepted by the baffle, as shown by lines C and D in Fig. 2, thus effectually preventing exit or projection of direct rays outward from the lamp filament through the lens 11 closing the light emitting opening of the headlight. Obviously, horizontal adjustability of the baffle is rendered possible through the medium of the threaded screw 10, thus to vary the intervening space between the lamp and the baffle, as desired, and, additionally, to compensate for any adjustment made in the focus of the lamp, as hereinbefore described.

The refracting lens 11, retained in position in the casing 1 in the ordinary manner, is made of convex form and of translucent glass having an amber or yellowish color so that the same may function somewhat in the nature of a filtering lens. The front face of said lens has a smooth surface devoid of irregularities, while the entire rear or interior face is sinuous, in cross section (Fig. 4) having therein a plurality of parallel equally spaced flutes or grooves of substantial depth extending substantially throughout the entire area of the surface, which construction affords the characteristics and functions of the so-called spread-light lens.

In practice, and in use on an automobile, a set of two headlights are mounted upon the front end of an automobile in the approximate center thereof and below and auxiliary to the usual standard headlights 12. Said lights are connected to a suitable supporting rod of the automobile by means of a universal connection, one form of which is shown at 13. Obviously, such universal mounting permits of adjustment of the lamp in any desired direction. Each lamp is disposed at an opposite outwardly directed angle and is fixed in this position when adjusted to the angle desired.

The glass lens 11 of each light is positioned in the casing 1 with the flutes thereof in non-vertical position, the same, instead, occupying an angle of inclination of approximately 70° and 110° to the horizontal axis. The flutes of each lens are responsible for the refraction of the beam of light so that, when striking the highway, it illuminates an elongated rectangular area with no diffusion. It will thus be noted that each of the light projectors 1 is disposed at an angle of approximately 30° relative to the longitudinal axis of the car, as shown in Fig. 1, and each light projector is disposed at an inclination of approximately 15° to a vertical plane as shown in Fig. 7, and that the flutes of each lens are disposed at an inclination of about 20° to the vertical axial plane of the reflector as depicted in Fig. 3 and 5. When once positioned as described and as illustrated the set of lights will project forwardly onto the highway two beams A and B of non-diffused concentrated light with a substantially darkened area intermediate and parallel to the edges of the road. Furthermore, as is illustrated in Fig. 7 of the drawings, the light is projected forwardly and downwardly at an angle out of the line of vision of the operator.

Blinding glare is eliminated by the baffle 8 since, as hereinbefore stated, this element intercepts all direct forwardly projected light rays emanating from the lamp filament. By virtue of the baffle 8 no light rays are directed forwardly and by the recited disposition of the reflectors relative to the vehicle and to the road as well as the disposition of the flutes of each lens the two parallel beams A and B result, thus obtaining good illumination in foggy weather.

Figure 6 of the drawings discloses a modified form of the invention wherein two separate reflectors 2ᵃ and two light sources are angularly and correctly positioned in a single appropriately shaped casing 14, the latter having a single lens 11ᵃ at its front, the lens being composed of two sections which converge and meet at the longitudinal axis of the casing; the flutes of each section having a relative inclination of approximately 20° to the vertical axial plane of the reflector which the section covers.

Moreover, as will appear manifest to those skilled in the art, other modifications and/or combinations of the structural elements hereinbefore described are possible so as to accomplish the desired results. It will be understood, therefore, that I do not limit myself to details of construction and arrangement of parts except as may be required by a fair interpretation of the terms of the appended claims.

What is claimed is:—

1. A vehicle light projector comprising a parabolic reflector, a light source substantially at the focus of the reflector, a lens closing the reflector, one face of said lens being provided with light spreading parallel flutes, said flutes being so positioned that they stand at an angle of approximately 20° to the vertical axial plane of the reflector, a baffle supported within the reflector and mounted in front of the light source so as to prevent any direct rays of light from passing through the lens, amber color means to color the light rays that pass through the lens, said light projector being mounted on the vehicle with its longitudinal axis inclined downwardly and to one side so as to project an elongated narrow beam of light along the edge of the road and parallel thereto.

2. A vehicle light projector comprising a pair of parabolic reflectors, a light source substantially at the focus of each of the reflectors, a lens closing each reflector, one face of each lens being provided with light spreading parallel flutes, said flutes being so positioned that they stand at an angle of approximately 20° to the vertical axial plane of the reflector, a baffle supported within each reflector and mounted in front of the light source thereof so as to prevent any direct rays of light from passing through the lens, amber color means to color the light rays that pass through each lens, said reflectors being mounted on the vehicle with their longitudinal axes inclined downwardly and divergently laterally so as to project a pair of elongated narrow beams of light which beams are parallel to one another and to the respective side edges of the road.

3. A vehicle light projector comprising a housing, a pair of parabolic reflectors mounted in side by side relation within said housing and having their longitudinal axes diverging forwardly and inclined downwardly, a unitary lens at the front of the housing, a source of light in each reflector, a baffle arranged in front of each source of light and disposed so as to prevent direct rays from the source of light from passing through the lens, the lens having a pair of rearwardly diverging sections, each section covering a reflector and provided with parallel flutes, the flutes of each section being so positioned that they stand at an angle of approximately 20° to the vertical axial plane of the reflector which it covers, the flutes of one section being inclined to the flutes of the other section of the lens, said light projector being mounted on the vehicle so as to project a pair of narrow elongated beams of light parallel to one another and to the respective edges of the road.

4. A vehicle light projector comprising a parabolic reflector, a light source substantially at the focus of the reflector, a lens closing the reflector, one face of said lens being provided with light spreading parallel flutes, said flutes being so positioned that they stand at an angle of approximately 20° to the vertical axial plane of the reflector, and a baffle supported within the reflector and mounted in front of the light source so as to prevent any direct rays of light from passing through the lens, said light projector being mounted on the vehicle with its longitudinal axis inclined downwardly and to one side so as to project an elongated narrow beam of light along the edge of the road and parallel thereto.

MARTIN F. RICH.